United States Patent
Grigsby et al.

(10) Patent No.: US 7,979,538 B2
(45) Date of Patent: Jul. 12, 2011

(54) REDIRECTING WEB DOWNLOADS

(75) Inventors: Travis M. Grigsby, Austin, TX (US);
Thomas J. Freund, Austin, TX (US);
Albert Andrus Lamb, Somerville, MA (US); Lee Michael Surprenant, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 287 days.

(21) Appl. No.: 12/178,052

(22) Filed: Jul. 23, 2008

(65) Prior Publication Data
US 2010/0023615 A1    Jan. 28, 2010

(51) Int. Cl.
*G06F 15/173* (2006.01)
(52) U.S. Cl. ........ 709/224; 709/225; 709/232; 709/203; 709/204; 709/205; 709/206
(58) Field of Classification Search .......... 709/224–225, 709/232, 203–206
See application file for complete search history.

(56) References Cited

U.S. PATENT DOCUMENTS

| | | | |
|---|---|---|---|
| 7,764,701 B1 * | 7/2010 | Issa et al. | 370/408 |
| 2006/0029093 A1 * | 2/2006 | Van Rossum | 370/432 |
| 2008/0235391 A1 * | 9/2008 | Painter et al. | 709/232 |
| 2008/0289006 A1 * | 11/2008 | Hock et al. | 726/4 |

* cited by examiner

*Primary Examiner* — Wing F Chan
*Assistant Examiner* — Benjamin M Thieu
(74) *Attorney, Agent, or Firm* — Patents On Demand, P.A.; Brian K. Buchheit; Scott M. Garrett (57) ABSTRACT

One or more downloads of web content from one or more web content servers are monitored. A swarm is defined including one or more previous downloaders of the web content from the one or more web content servers. The one or more previous downloaders of the web content include one or more web content caches including at least a portion of the web content. Stored web content within the one or more web content caches of the swarm is tracked. A new downloader of the one or more web content servers is redirected to the one or more web content caches of the swarm.

19 Claims, 2 Drawing Sheets

REDIRECTING WEB DOWNLOADS

BACKGROUND OF THE INVENTION

This disclosure relates to web downloads, and more particularly to redirecting web downloads.

Web servers are often called upon to deliver web content to multiple visitors of the web server. When a web site catches the attention of a large number of people, an internet flash crowd may occur. An internet flash crowd may overburden a web server or a group of web servers. It may be costly for a web service provider to maintain the hardware, software, and bandwidth capacity necessary to withstand the content requests and demands of a flash crowd while avoiding decreased performance.

Web content downloaders, e.g. web browsers, often retain downloaded web content from a website in a cache. The downloaded web content may be retained so that it can be recalled when the web content downloader revisits the same website.

BRIEF SUMMARY OF THE INVENTION

In a first implementation, a method of redirecting web content downloads includes monitoring one or more downloads of web content from one or more web content servers. A swarm is defined including one or more previous downloaders of the web content from the one or more web content servers. The one or more previous downloaders of the web content include one or more web content caches. The one or more web content caches include at least a portion of the web content. Stored web content within the one or more web content caches of the swarm is tracked. A new downloader of the one or more web content servers is redirected to the one or more web content caches of the swarm.

According to another implementation, a computer program product resides on a computer readable medium having a plurality of instructions thereon, which, when executed by a processor cause the processor to perform operations including monitoring one or more downloads of web content from one or more web content servers. A swarm is defined including one or more previous downloaders of the web content from the one or more web content servers. The one or more previous downloaders of the web content include one or more web content caches. The one or more web content caches include at least a portion of the web content. Stored web content within the one or more web content caches of the swarm is tracked. A new downloader of the one or more web content servers is redirected to the one or more web content caches of the swarm.

In another implementation, computing system includes at least one processor and at least one memory architecture coupled with the at least one processor. A first software module is executed on the at least one processor and the at least one memory architecture. The first software module is configured to monitor one or more downloads of web content from one or more web content servers. A second software module is executed on the at least one processor and the at least one memory architecture. The second software module is configured to define a swarm including one or more previous downloaders of the web content from the one or more web content servers. The one or more previous downloaders of the web content include one or more web content caches including at least a portion of the web content. A third software module is also executed on the at least one processor and the at least one memory architecture. The third software module is configured to track stored web content within the one or more web content caches of the swarm. Further, a fourth software module is executed on the at least one processor and the at least one memory architecture. The fourth software module is configured to redirect a new downloader of the one or more web content servers to the one or more web content caches of the swarm.

The details of one or more implementations are set forth in the accompanying drawings and the description below. Other features will become apparent from the description, the drawings, and the claims.

BRIEF DESCRIPTION OF THE SEVERAL VIEWS OF THE DRAWINGS

Like reference symbols in the various drawings denote like elements.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
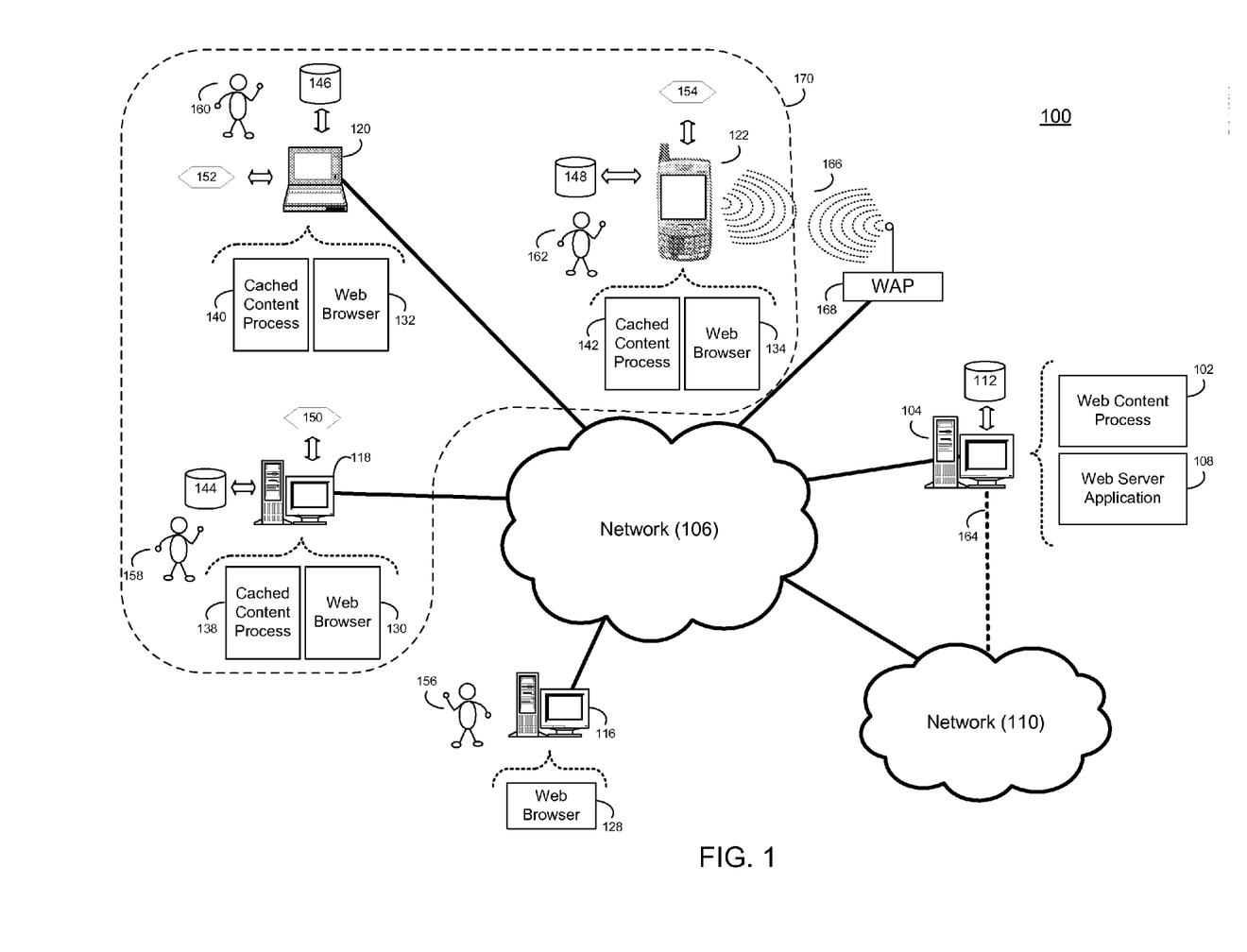
FIG. 1 diagrammatically depicts a web content process coupled to a distributed computing network.

A system and architecture 100 for a web content process is shown in FIG. 1. Web content process 102 may reside on and may be executed by server computer 104, which may be connected to network 106 (e.g., the Internet or a local area network). Examples of server computer 104 may include, but are not limited to: a personal computer, a server computer, a series of server computers, a mini computer, and a mainframe computer. As will be discussed below in greater detail, web content service 102 may monitor, track, and/or redirect web content requests. In addition, as an alternative, the web content process may reside on and may be executed by one or more client electronic devices, such as a personal computer, notebook computer, personal digital assistant, and data enabled cellular phone, for example.

Server computer 104 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). Additionally, server computer 104 may run a web server application, such as web server application 108, examples of which may include but are not limited to: Microsoft IIS, Novell Webserver™, or Apache® Webserver, that allows for HTTP (i.e., HyperText Transfer Protocol) access to server computer 104 via network 106 and/or network 110 (Webserver is a trademark of Novell Corporation in the United States, other countries, or both; and Apache is a registered trademark of Apache Software Foundation in the United States, other countries, or both). Web content process 102 may be a standalone application or may be an applet/application that runs within and/or interfaces with web server application 108. In further embodiments, web content process 102 may reside on a separate computing device from web server application.

The instruction sets and subroutines of web content process 102, which may be configured as one or more software modules, and web server application 108, which may be stored on storage device 112 coupled to server computer 104, may be executed by one or more processors (not shown) and one or more memory architectures (not shown) incorporated into server computer 104. Storage device 112 may include but is not limited to: a hard disk drive; a solid state drive; a tape drive; an optical drive; a RAID array; a random access memory (RAM); and a read-only memory (ROM).

Various computing devices, including but not limited to desktop computer 116, desktop computer 118, laptop computer 120, and/or personal computing device 122, may interact with server computer 104 via network 106. Network 106 may be connected to one or more secondary networks (e.g., network 110), examples of which may include but are not limited to: a local area network; a wide area network; or an intranet, for example. The aforementioned various computing devices may execute network operating systems including, but not limited to: Microsoft Windows and Red Hat Linux. The various computing devices may also execute other applications and/or services.

Desktop computer 116, desktop computer 118, laptop computer 120, and personal computing device 122 may execute web browsers 128, 130, 132, and 134, respectively. Examples of web browsers 128, 130, 132, 134 include, but are not limited to Microsoft Internet Explorer Mozilla® Firefox®, and Opera Software® web browsers (Internet Explorer is a registered trademark of Microsoft Corporation in the United States, other countries, or both; Mozilla is a registered trademark of Mozilla Foundation Corporation in the United States, other countries, or both; Firefox is a registered trademark of Mozilla Foundation Corporation in the United States, other countries, or both; and Opera Software is a registered trademark of Opera Software AS. Corporation in the United States, other countries, or both). Additionally or alternatively, desktop computer 118, laptop computer 120 and personal computing device 122 may execute cached content process 138, cached content process 140, and cached content process 142, respectively. The instruction sets and subroutines of web browsers 130, 132, 134 and cached content processes 138, 140, 142 may be stored on storage devices 144, 146, 148, which may be coupled to desktop computer 118, laptop computer 120, and personal computing device 122, respectively. Cached content processes 138, 140, 142 may be stand-alone applications, services, applets, plug-ins, and/or any other form of executable software. Storage devices 144, 146, 148 may include but are not limited to: a hard disk drive; a solid state drive; a tape drive; an optical drive; a RAID array; a random access memory (RAM); and a read-only memory (ROM). As will be discussed in greater detail, cached content processes 138, 140, 142 may receive requests for cached content.

Web content caches 150, 152, 154 (e.g., which may be provided by web browsers 130, 132, 134 and/or cached content processes 138, 140, 142) may also reside on desktop computer 118, laptop computer 120 and personal computing device 122, respectively. As will be discussed, web content caches 150, 152, 154 may contain cached web content (i.e., stored web content), including web content received from one server computer 104 (e.g., via web server application 108). Web content caches may 150, 152, 154 may be stored on storage devices 144, 146, 148, respectively.

Users, e.g., users 156, 158, 160, 162, may request web content (e.g., via one or more of web browsers 128, 130, 132, 134 and/or cached content processes 138, 140, 142) from server computer 104 directly through network 106 or through secondary network 110. Further, server computer 104 (i.e., the computer that executes web content process 102) may be connected to network 106 through secondary network 110, as illustrated with phantom link line 164.

Server computer 104 and the various computing devices shown in FIG. 1 (e.g., desktop computer 116, desktop computer 118, laptop computer 120, and personal computing device 122), as well as other computing devices, may be directly or indirectly coupled to network 106 (or network 110). For example, personal computing device 122 is shown wirelessly coupled to network 106 via wireless communication channel 166 established between personal computing device 122 and a wireless access point (i.e., WAP) 168, directly coupled to network 106. WAP 168 may be, for example, an IEEE 802.11a, 802.11b, 802.11g, Wi-Fi, and/or Bluetooth device that is capable of establishing wireless communication channel 166 between personal computing device 122 and WAP 168. Further, server computer 104 is shown directly coupled to network 106 via a hardwired network connection.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

As mentioned, computing devices including server computer 104, desktop computer 116, desktop computer 118, laptop computer 120, and personal computing device 122 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

For purposes of illustration, the following discussion will refer to web desktop computer 116 as a new downloader of the web content and to desktop computer 118, laptop computer 120, and personal computing device 122 as previous downloaders of the web content. However, this should not be construed as a limitation of this disclosures, as other computing devices may be new downloaders and previous downloaders.

Figure 2:
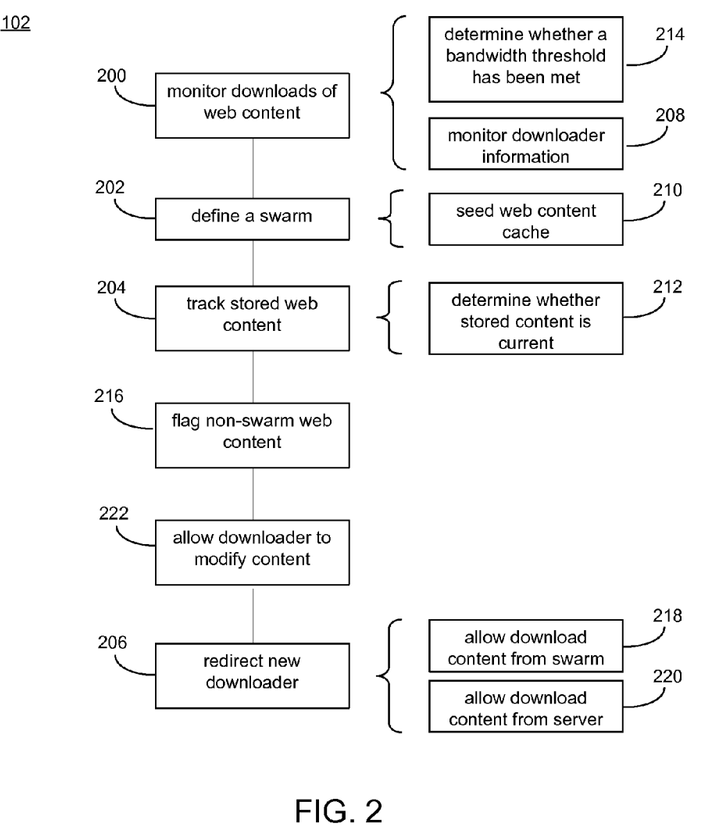
FIG. 2 is a flowchart of a process executed by the web content process of FIG. 1.

Referring also to FIG. 2, web content processes 102 may monitor 200 one or more downloads of web content (e.g., which may be stored on storage device 112) from one or more web content servers. A swarm may be defined 202, in which the swarm includes one or more previous downloaders of the web content from the one or more web content servers. One or more of the previous downloaders may include one or more web content caches. At least a portion of the downloaded web content may be included in the one or more web content caches. Web content process may track 204 stored web content included within the one or more web content caches of the swarm. Further, web content process 102 may redirect 206 a new downloader of the one or more web content servers to the one or more web content caches of the swarm. For example, instead of handling all web content requests directly, web content process 102 may redirect 206 web content requests to other computing devices which have previously downloaded the web content, in which at least a portion of the downloaded web content is stored within a web content cache. These other computing devices may have copies of the web content in a cache and may be able to process the web content request by serving out the copies of the web content.

Web content process 102 may monitor 200 downloads of web content from server computer 104 (e.g., via web server application 108). Server computer 104 may execute web server application 108 that may make web content available for download via network 106 (or network 110). For example, one or more user (e.g., user 158, user 160, user 162) may each access web server application 108 (e.g., using desktop computer 118, laptop computer 120, and personal computing device 122 via web browser 130, 132, 134 respectively) via network 106 (or network 110) and may request web content from web server application 108. Web content process 102 may monitor 200 one or more requests for web content and may also monitor 200 one or more downloads of web content from server computer 104. In a further example, downloads of web content from server computer 104 may be monitored 200 by a third party, e.g., which may monitor traffic associated with a website capable of accessing the web content. In such an example, web content process 102 may receive information regarding downloads of the web content, e.g., as a web service, from the third party.

Monitoring 200 the one or more downloads of web content from server computer 104 (e.g., from web server application 108) may include monitoring 208 downloader information. For example, when a request for web content is received (e.g., by web content process 102 and/or web server application 108), web content 102 may monitor 208 (e.g., and store or otherwise log) the identity of the downloader (e.g., desktop computer 118, laptop computer 120, and/or personal computing device 122), the nature of the downloaded web content (e.g., the one or more webpages and/or features of one or more webpages downloaded by one or more of desktop computer 118, laptop computer 120, and/or personal computing device 122). The monitored 208 downloader information may include various additional and/or alternative information, including, but not limited to: the frequency of the requests, the size of web content requested, the location of the web content requested, the type of web content requested, the number of computing devices requesting web content, the location of the computing devices requesting web content, the address of computing devices requesting web content, bandwidth capabilities of the downloader (e.g., desktop computer 118, laptop computer 120, and/or personal computing device 122), information about the web browser (e.g., web browser 130, 132, 134) of the downloader, the presence of a cached content process (e.g., cached content process 138, 140, 142) or any other information about the web content requests.

Web content process 102 may define 202 a swarm (e.g., swarm 170) including one or more previous downloaders of the web content from the one or more web content servers (e.g., web server 104 executing web server application 108). Continuing with the above-stated example, desktop computer 118, laptop computer 120, and personal computing device 122 may download web content from server computer 104 (e.g., from web server application 108). Each of desktop computer 118, laptop computer 120, and personal computing device 122 may each include one or more web content caches (e.g., web content caches 150, 152, 154, provided by one or more of web browsers 130, 132, 134 and/or cached content processes 138, 140, 142, respectively). The one or more web content caches of desktop computer 118, laptop computer 120, and personal computing device 122 may include (e.g., may store) at least a portion of the downloaded web content.

Consistent with the foregoing, swarm 170 defined 202 by web content process 102 may include a group of one or more computing devices (e.g., desktop computer 118, laptop computer 120, and personal computing device 122) that have previously downloaded web content from server computer 104. The computing devices may also retain at least a partial copy of the downloaded web content in one or more content caches. For example, user 160 may request web content (i.e. web pages, HTML files, XML files, gif or jpg images, media files, etc.) from server computer 104. User 160 may download and view the web content via laptop computer 120 and web browser 132. Web browser 132 (alone or in conjunction with cached content process 140, e.g., which may include an applet or application downloaded to laptop computer 120 by web content process 102) may retain a copy of at least a portion of the web content in a web content cache (e.g., web content cache 152), for example. As such, at least a portion of the downloaded web content may be stored in the one or more web content caches.

Additionally, defining 202 the swarm may include seeding one or more of the web content caches with web content. For example, in addition to web content downloaded by a computing device (e.g., desktop computer 118, laptop computer 120, and/or personal computing device 122), web content process 102 may seed 210 one or more web content caches (e.g., web content caches 150, 152, 154) with web content. Seeding 210 one or more web content cache may include downloading web content to the one or more web content caches, e.g., which may be in addition to web content requested by a user (e.g., user 158, 160, 162) via a web browser (e.g., web browser 130, 132, 134). Users 158, 160, 162 may be remunerated for receiving and/or subsequently allowing access to seeded content. Remuneration may include, for example, direct payment, goods or services (e.g., such as credit towards downloads, such as media downloads from music download services), the right of the seeded user to insert ads into the web content, etc.

Continuing with the above-stated example, a user (e.g., user 158) may request a web page from web server application 108 via web browser 130. Web server application 108 may allow the requested web page to be downloaded to desktop computer 118 (e.g., via web browser 130). Additionally, web content process 102 may include additional web content (e.g., corresponding to another web page, features of a web page, and/or other web content) with the requested web content. The additional web content may be stored (e.g., by one or more of web browser 130 and cached content process 138) in web content cache 150, for example. In addition to including the additional web content with requested web content, web content process 102 may seed 210 the one or more web content caches (e.g., web content caches 150, 152, 154) with web content by pushing the web content to the one or more downloaders (e.g., desktop computer 118, laptop computer 120, and/or personal computing device 122) via one or more of a web browser (e.g., web browser 130, 132, 134) and/or a cached content process (e.g., cached content processes 138, 140, 142). As such, seeding 210 one or more web content caches with the web content may result in the web content being stored in the one or more web content caches.

Web process 102 may track 204 stored web content within the one or more web content caches (e.g., web content caches 150, 152, 154) of swarm 170 (e.g., which may include desktop computer 118, laptop computer 120, and personal computing device 122, in the foregoing example). Tracking 204 stored web content within the one or more web content caches of swarm 170 may include, for example, storing a log of the web content that has been downloaded from server computer 104 and the identity, address, or the like, of the downloader (e.g., desktop computer 118, laptop computer 120, and personal computing device 122). For example, user 162 may request web content from server computer 104 via personal computing device 122 and/or web browser 134. Web process 102 may track 204 the web content (e.g., which may include one or more web pages, items within a web page, or the like) downloaded to personal computing device 122 (e.g., which may be stored in web content cache 154). Continuing with the above-stated example, in one embodiment, web process 102 may communicate with cached content process 142 to track 204 stored web content within web content cache 154 of personal computing device 122. In another embodiment, web process 102 may track 204 stored web content within web content cache 154 based upon, at least in part, retained information about the web content downloaded by personal computing device 122 (e.g., based upon, at least in part, an identity and/or address of personal computing device 122 and the web content downloaded to personal computing device 122. Many and various methods of tracking 204 the contents of a web content cache, may additionally/alternatively be employed.

Tracking 204 stored web content may also include determining 212 whether the web contents within a web content cache are current. Continuing with the above-stated example, in which web content has been downloaded to personal computing device 122 (e.g., via web browser 134) and at least a portion of the web content is stored in web content cache 154, web content process 102 may determine if the at least a portion of the web content stored in web content cache corresponds to the current state of the web content (e.g., which may reside on storage device 112 of server computer 104 and may be available for download via web server application 108). Web content process 102 may determine 212 whether the web content stored within web content cache 154 is current, for example, based upon, at least in part, whether the web content has been changed (e.g., updated) since it was downloaded by personal computing device 122. For example, based upon monitored 208 downloader information, web content process 102 may know when the web content was downloaded by personal computing device 122. Additionally, web content process 102 may maintain a log of changes to the web content available for download via web server application 108.

Based upon, at least in part, when the web content was downloaded by personal computing device 122 and based upon, at least in part, whether the web content available for download via web server application 108 has been changed since the web content was downloaded by personal computing device 122, web content process 102 may determine 212 whether the web content stored within web cache 154 is current. Various additional/alternative mechanisms may be employed for determining 212 if the web content stored within the one or more web content caches is current, including for example, web content process 102 polling the one or more web content caches, e.g., via a web browser and/or cached content process respectively associated with the one or more web content caches.

Web content process 102 may redirect 206 a new downloader of the one or more web content servers to the one or more content caches of the swarm. For example, if a user (e.g., user 156) may request download of web content from server computer 104 using desktop computer 116 (e.g., a new downloader) using web browser 128. Web content process 102 may redirect 206 web browser 128 (e.g., executed by the new downloader desktop computer 116) to one or more of web content caches 150, 152, 154 of swarm 170. Web browser 128 may accordingly, download at least a portion of the requested web content from one or more of web content caches 150, 152, 154 (e.g., web browser 128 may download at least a portion of the web content from one web content cache, and/or may download different portions of the web content from different ones of the web content caches). Web content process 102 may provide remuneration for allowing access to web content from the one or more web content caches of the swarm. For example, web content process 102 may remunerate users 158, 160, 162 for allowing access to web content stored in web content caches 150, 152, 154. Remuneration may include, for example, direct payment, goods or services (e.g., such as credit towards downloads, such as media downloads from music download services), the right of the seeded user to insert ads into the web content, etc.

According to an embodiment, web content process 102 may redirect 206 a new downloader of the web content to one or more web content caches, for example, as a mechanism for managing bandwidth capabilities of server computer 104 and/or network 106 or network 110. For example, in the event of a relatively high volume of web content download requests, server computer 104, web server application 108, network 106 and/or network 110 may not be capable of reasonably satisfying all of the download requests without exhibiting degraded performance. In such a situation, web content process 102 may redirect 206 at least a portion of new downloaders of the web content to one or more of the web content caches (e.g., web content caches 150, 152, 154). As such, web content may be provided to one or more new downloaders during times of relatively high volume web content requests without the need to maintain hardware, software, and bandwidth capabilities necessary to accommodate such relatively high volumes of web content requests.

As stated above, web content process 102 may monitor 200 the one or more downloads of the web content. Monitoring 200 the one or more downloads of the web content may include determining 214 whether a bandwidth threshold has been met. The bandwidth threshold may be a bandwidth requirement necessary to satisfy download requests, which cannot be met without realizing an unsatisfactory degradation of web content download performance. If web content process 102 determines 214 that a bandwidth threshold has been met (i.e., that server computer 104 and/or web server application 108 cannot meet web content requests without realizing the unsatisfactory degradation of web content download performance), web content process 102 may redirect 206 at least a portion of new downloaders of the web content to one or more of the web content caches.

In a similar manner, other sources for web traffic prediction may be utilized. For example, a website hosted by web server application 108 may be listed in a recent entry on a social content site, news aggregation site or the like (such as www.digg.com or www.reddit.com). As such, there may be an increased chance that the website hosted by web server application 108 may soon experience increased traffic. In response to such a forecast of web traffic, web content process 102 may begin redirecting 206 at least a portion of new downloaders of the web content to one or more of the web content caches.

As discussed, the web content caches of the computing devices of swarm 170 may contain copies of at least a portion of the web content. For example, desktop computer 118, laptop computer 120, and personal computing device 122 each may have downloaded web content (e.g., one or more web pages, portions of web pages, and/or one or more portions of web pages) from server computer 104. Instead of handling subsequent web content download requests (i.e., web content requests from new downloaders) itself, server computer 104 and/or web content process 102 may redirect 206 the new content downloader (e.g., desktop computer 116) to receive the web content from one or more of web content caches 150, 152, and/or 154. For example, if user 156 requests web content from server computer 104 via desktop computer 116, server computer 104 may redirect 206 desktop computer 116 to receive at least a portion of the web content from one or more of web content cache 150, 152, and/or 154 associated with desktop computer 118, laptop computer 120, and personal computing device 122, respectively. One or more of cached content processes 138, 140, and/or 142 may then supply at least a portion of the web content to desktop computer 116. Desktop computer 116 may then receive at least a portion of the web content, not from server computer 104, but rather from one or more of desktop computer 118, laptop computer 120, and/or personal computing device 122. More generally, web content process 102 may redirect 206 a new content downloader to any and/or all computing devices within swarm 170, and the new content downloader may receive at least a portion of the web content from any and/or all computing devices within swarm 170.

Web content process 102 may redirect 206 a new web content downloader to receive web content from one previous downloader (e.g., desk top computer 118) within swarm 170, from all previous downloaders (e.g., desktop computer 118, laptop computer 120, and personal computing device 122) within swarm 170, or from any combination of previous downloaders (e.g., at least a portion from desktop computer 118 and at least a portion from personal computing device 122) within swarm 170. Additionally, web content process 102 may redirect 206 various new content downloaders to receive web content from different previous downloader, thus distributing the requests among more than one previous downloader.

For example, if a web site (e.g., which may be hosted by server computer 104 and web server application 108) has multiple pages, and if the multiple pages are resident on multiple web content caches (e.g., web content caches 150, 152, 154) within swarm 170, web content process 102 may redirect 206 a new downloader of web content to request a first web page from a first web content cache, a second web page from a second web content cache, a third web page from a third web content cache, etc.

Redirecting 206 the new downloader of the one or more web content servers may include redirecting 206 a first new downloader (e.g., desktop computer 116) to the stored web content within one or more first web content caches (e.g., web content cache 150 of desktop computer 118) of swarm 170. Further, web content process 102 may redirect 206 a second new downloader (e.g., personal computing device 122, which may be a new downloader in addition to being a previous downloader) to the stored web content within one or more second web content caches (e.g., web content cache 152 of laptop computer 120) of swarm 170. As such, web content process may load balance access requests to the one or more web content caches of swarm 170.

Web content process 102 may flag 216 at least a portion of the web content residing on the web content server (e.g., server computer 104) as non-swarm content. If a new downloader requests non-swarm web content, web content process 102 may refrain from redirecting 206 the new downloader to web content caches within swarm 170. For example, server computer 104 may contain a blog web site. The blog website may include relatively static blog entries that may not change frequently, and relatively dynamic blog comments that do change frequently. Web content process 102 may flag 216 some of the blog web site content (e.g., the relatively dynamic blog comments) as non-swarm content. Accordingly, web content process 102 may redirect 206 a new downloader (e.g., desktop computer 116) to one or more web content caches (e.g., web content caches 150, 152, 154) and allow 218 desktop computer 116 to download blog entries from swarm 170 (e.g., retrieve blog entries from one or more of web content caches 150, 152, 154). Similarly, web content process 102 may not redirect desktop computer 116 to swarm 170 for downloading flagged 218 content (e.g., blog comments), but rather may allow 220 the new downloader (e.g., desktop computer 116) to download blog comments from server computer 104 (e.g., via web server application 108).

Web content process 102 (alone or in conjunction with one or more of cached content processes 138, 140, 142) may allow 222 a previous downloader (e.g., desktop computer 118, laptop computer 120, personal computing device 122) of the web content to modify at least part of the content within the one or more web content cache of the one or more previous downloaders (e.g., one or more of web content caches 150, 152, 154 of desktop computer 118, laptop computer 120, and personal computer device 122, respectively). For example, web content process 102 may allow 222 user 158 to modify previously downloaded web content (e.g., which may be stored in web content cache 150 associated with previous downloader desktop computer 118), e.g., by inserting an advertisement into the web content, adding content, removing content or the like. Web content process 102 may redirect 206 a new downloader (e.g., desktop computer 116) to download requested web content from web content cache 150. As such, when desktop computer 116 downloads (e.g., using web browser 128) the web content from web content cache 150, desktop computer 116 may download the modified web content.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of redirecting web content downloads comprising:
   monitoring one or more downloads of web pages and related content from one or more web servers to one or more web browsers that request web pages from the web servers, wherein at least a portion of the web browsers cache the web pages provided by the web servers in a local web content cache, wherein the local web content cache is used by the corresponding web browser to improve speech on subsequent requests to the same Web pages;
   defining a swarm including one or more previous downloaders of the web pages and related content from the one or more web servers, wherein the one or more previous downloaders of the web pages and related content include one or more web content caches including at least a portion of the web pages and related content;
   flagging at least a portion of the web pages residing on the web server as non-swarm content, which is always provided directly from the web server to satisfy client side requests, wherein other portions of web page pages provided by the web server are flagged as being able to be provided from by redirecting a requesting client to one or more of the web content caches;
   tracking stored web pages within the one or more web content caches of the swarm;
   determining whether a bandwidth capabilities of the web server results in the web server being not capable of reasonably satisfying current requests without exhibiting degraded performance;

when the bandwidth capabilities are not capable of reasonably satisfying the customer requests without exhibiting degraded performance, redirecting a new downloader that requested the web pages and related content from the one or more web servers to the one or more web content caches of the swarm; and when the bandwidth threshold has not been met or exceeded, the web server directly serving the web pages and related content to the one or more client-side browsers in response to the request.

2. The method of claim 1, further comprising:
remunerating owners of each of the web content caches for permitting the web server to perform redirect request to that web content cache.

3. The method of claim 1, wherein monitoring the one of more downloads of the web pages and related content includes monitoring downloader information, and wherein each of the web content caches are local client-side caches that is used by the corresponding web browser to improve speed on subsequent requests to the same web pages and related content as was previously requested of the web server.

4. The method of claim 1, wherein defining the swarm further includes seeding one or more of the web content caches with the web pages and related content that was requested by a client-side browser.

5. The method of claim 1, wherein tracking stored web pages and related content within one or more of the web content caches of the swarm includes determining whether the stored web pages and related content is current.

6. The method of claim 1, wherein redirecting the new downloader of the one or more web servers includes allowing the new downloader to download at least a portion of the web pages and related content from one or more of the web content caches of the swarm.

7. The method of claim 1, wherein the Web server provides not requested content in addition to requested content to requesting clients for storage within that client's specific web content cache, so that the not requested content is available for redirection as necessary.

8. The method of claim 1, wherein redirecting the new downloader of the one or more web servers includes:
redirecting a first new downloader to the stored web within one or more first web content caches of the swarm; and
redirecting a second new downloader to the stored web pages and related content within one or more second web caches of the swarm, thus load balancing access requests to the one or more web content caches of the swarm.

9. The method of claim 1, further including allowing the one or more previous
downloaders of the web pages and related content to modify at least a portion of the web pages and related content stored
within the one or more web content cache of the one or more previous downloaders.

10. A computer program product residing on a non-transitory computer readable medium having a plurality of instructions stored thereon, which, when executed by a processor, cause the processor to perform operations comprising:
monitoring one or more downloads of web pages and related content from one or more web servers to one or more web browsers that request web pages from the web servers, wherein at least a portion of the web browsers cache the web pages provided by the web servers in a local web content cache, wherein the local web content cache is used by the corresponding web browser to improve speech on subsequent requests to the same Web pages;
defining a swarm including one or more previous downloaders of the web pages and related content from the one or more web servers, wherein the one or more previous downloaders of the web pages and related content include one or more web content caches including at least a portion of the web pages and related content;
flagging at least a portion of the web pages residing on the web server as non-swarm content, which is always provided directly from the web server to satisfy client side requests, wherein other portions of web page pages provided by the web server are flagged as being able to be provided from by redirecting a requesting client to one or more of the web content caches;
tracking stored web pages within the one or more web content caches of the swarm;
determining whether a bandwidth capabilities of the web server results in the web server being not capable of reasonably satisfying current requests without exhibiting degraded performance;
when the bandwidth capabilities are not capable of reasonably satisfying the customer requests without exhibiting degraded performance, redirecting a new downloader that requested the web pages and related content from the one or more web servers to the one or more web content caches of the swarm; and
when the bandwidth threshold has not been met or exceeded, the web server directly serving the web pages and related content to the one or more client-side browsers in response to the request.

11. The computer program product of claim 10, further comprising:
remunerating owners of each of the web content caches for permitting the web server to perform redirect request to that web content cache.

12. The computer program product of claim 10, wherein each of the web content caches are local client-side caches that is used by the corresponding web browser to improve speed on subsequent requests to the same web pages and related content as was previously requested of the web server.

13. The computer program product of claim 10, wherein the instructions for defining the swarm further include instructions for seeding one or more of the web content caches with the web pages and related content that was requested by a client-side browser, wherein the web pages and related content comprises a web page served by the web server to the client-side browser.

14. The computer program product of claim 10, wherein the instructions for tracking stored web pages and related content within one or more of the web content caches of the swarm include instructions for determining whether the stored web pages and related content is current.

15. The computer program product of claim 10, wherein the instructions for redirecting the new downloader of the one or more web servers include instructions for allowing the new downloader to download at least a portion of the web pages and related content from one or more of the web content caches of the swarm.

16. The computer program product of claim 10, wherein the web server provides not requested content in addition to requested content to requesting clients for storage within that client's specific web content cache, so that the not requested content is available for redirection as necessary.

17. The computer program product of claim 10, further including instructions for flagging at least a portion of the web pages and related content residing on the web server as non-swarm content, which is always provided directly from the web server to satisfy client side requests, wherein other portions of web pages and related content provided by the web server are flagged as being able to be provided from by redirecting a requesting client to one or more of the web content caches.

18. The computer program product of claim 10, further including instructions for allowing the one or more previous downloaders of the web pages and related content to modify at least a portion of the web pages and related content stored within the one or more web content cache of the one or more previous downloaders.

19. A computing system comprising:
at least one processor;
at least one memory architecture coupled with the at least one processor;
a first software module executed on the at least one processor and the at least one memory architecture, wherein the first software module is configured to monitor one or more downloads of web pages and related content from one or more web servers to one or more web browsers that request web pages from the web servers, wherein at least a portion of the web browsers cache the web pages provided by the web servers in a local web content cache, wherein the local web content cache is used by the corresponding web browser to improve speed on subsequent requests to the same Web pages;
a second software module executed on the at least one processor and the at least one memory architecture, wherein the second software module is configured to define a swarm including one or more previous downloaders of the web pages from the one or more web servers, wherein the one or more previous downloaders of the web pages include one or more of the web content caches including at least a portion of the web pages;
a third software module executed on the at least one processor and the at least one memory architecture, wherein the third software module is configured to track stored web pages within the one or more web content caches of the swarm;
a fourth software module executed on the at least one processor and the at least one memory architecture, wherein the fourth software module is configured to selectively redirect a new downloaders of the one or more web servers to the one or more web content caches of the swarm when bandwidth capabilities of the one or more web servers result in the one or more web servers being not capable of reasonably satisfying current requests without exhibiting degraded performance, wherein when bandwidth capabilities of the one or more web servers indicate the one or more web servers can reasonably satisfy current requests without exhibiting degraded performance, the fourth software module causes the one or more web servers to provide the requested Web pages directly without redirection; and
a fifth software module executed on the at least one processor and the at least one memory architecture, wherein the fifth software module is configured to flag at least a portion of the web pages residing on the web server as non-swarm content, which is always provided directly from the web server to satisfy client side requests, wherein other portions of web page pages provided by the web server are flagged as being able to be provided from by redirecting a requesting client to one or more of the web content caches.

* * * * *